United States Patent [19]

Garigioli

[11] 4,224,042

[45] Sep. 23, 1980

[54] OIL BATH AIR CLEANER

[75] Inventor: Alberto Garigioli, Pisa, Italy

[73] Assignee: Whitehead Motofides SpA, Italy

[21] Appl. No.: 954,660

[22] Filed: Oct. 25, 1978

[30] Foreign Application Priority Data

Oct. 25, 1977 [IT] Italy .............................. 69377 A/77

[51] Int. Cl.² .............................................. B01D 47/02

[52] U.S. Cl. ........................................ 55/237; 55/245; 55/249; 55/253; 55/259; 55/255; 55/482; 261/123

[58] Field of Search ................................. 55/224-226, 55/238, 239, 245, 249, 250, 252, 253, 255, 256, 482, 237, 259, 257 C; 261/123, DIG. 54

[56] References Cited

U.S. PATENT DOCUMENTS

| | | | |
|---|---|---|---|
| 1,884,808 | 10/1932 | Mosher | 55/245 |
| 2,171,752 | 9/1939 | Kamrath | 55/249 |
| 2,272,995 | 2/1942 | Neumann | 55/239 |
| 2,387,278 | 10/1945 | Lowther | 55/253 |
| 2,397,525 | 4/1946 | Bennett | 55/249 |
| 2,514,543 | 7/1950 | Hamman | 55/252 |
| 2,596,121 | 5/1952 | Brixius | 55/249 |
| 2,770,320 | 11/1956 | Dreznes | 55/485 |
| 2,987,138 | 6/1961 | Walton | 55/253 |
| 3,321,191 | 5/1967 | Najarian | 55/225 |
| 3,348,364 | 10/1967 | Henby | 55/257 C |
| 4,116,647 | 9/1978 | Garner | 55/253 |

FOREIGN PATENT DOCUMENTS

| | | | |
|---|---|---|---|
| 1113852 | 9/1961 | Fed. Rep. of Germany | 55/250 |
| 1278710 | 11/1961 | France | 55/250 |
| 682131 | 11/1952 | United Kingdom | 55/239 |
| 935040 | 8/1963 | United Kingdom | 55/250 |
| 566012 | 7/1977 | U.S.S.R. | 261/123 |
| 571287 | 9/1977 | U.S.S.R. | 55/249 |

*Primary Examiner*—David L. Lacey

*Attorney, Agent, or Firm*—Gifford, VanOphem, Sheridan & Sprinkle

[57] ABSTRACT

An air cleaner for internal combustion engines of the type comprising in a casing containing liquid, wherein the air is made to come into contact with the liquid is described.

The main feature of this air cleaner is that there are means to provide a substantially constant ratio between the quantity of air passing through said cleaner and the liquid quantity associated with the air during its passage.

13 Claims, 5 Drawing Figures

OIL BATH AIR CLEANER

BACKGROUND OF THE INVENTION

This invention relates to an air cleaner for internal combustion engines, of the type in which the air in the cleaner is made to come into contact with a liquid, which is conveniently oil. These cleaners are generally mounted on power machines in which the air is very dusty and dirty, such as earth working machines, tractors, trucks and the like.

Said cleaners of known type are generally in the form of a cylindrical outer casing in which the oil is contained at the bottom, with metal mesh filter cartridges disposed in the central and upper region. The air which is fed to the cleaner through an axial cylindrical conduit inside the container flows out into the lower inner region of the container which contains the oil. Part of the solid particles in the air is retained by the oil particles which rise by suction action, while the remainder is retained by the filter cartridges. The filtered air emerges from the container above the cartridges, drawn by the engine.

The aforesaid known cleaner give rise to certain drawbacks. In this respect, there are rather high pressure drops, and the filtering efficiency at the low air throughputs is rather poor, because the oil quantity which the air is associated with under these conditions during its passage is minimal and sometimes insufficient.

SUMMARY OF THE INVENTION

The object of the present invention is to provide an air cleaner of the aforesaid type in which the said drawbacks are absent.

The present invention provides an air cleaner for internal combustion engines of the type in which, within the air cleaner casing the air comes into contact with a liquid, comprising first means to provide a substantially constant ratio between the quantity of air passing through said cleaner and the liquid quantity associated with the air during its passage.

BRIEF DESCRIPTION OF THE DRAWINGS

The present invention will be more apparent from the description given hereinafter of two embodiments by way of non-limiting example, with reference to the accompanying drawings in which.

DETAILED DESCRIPTION OF THE INVENTION

Figure 1:
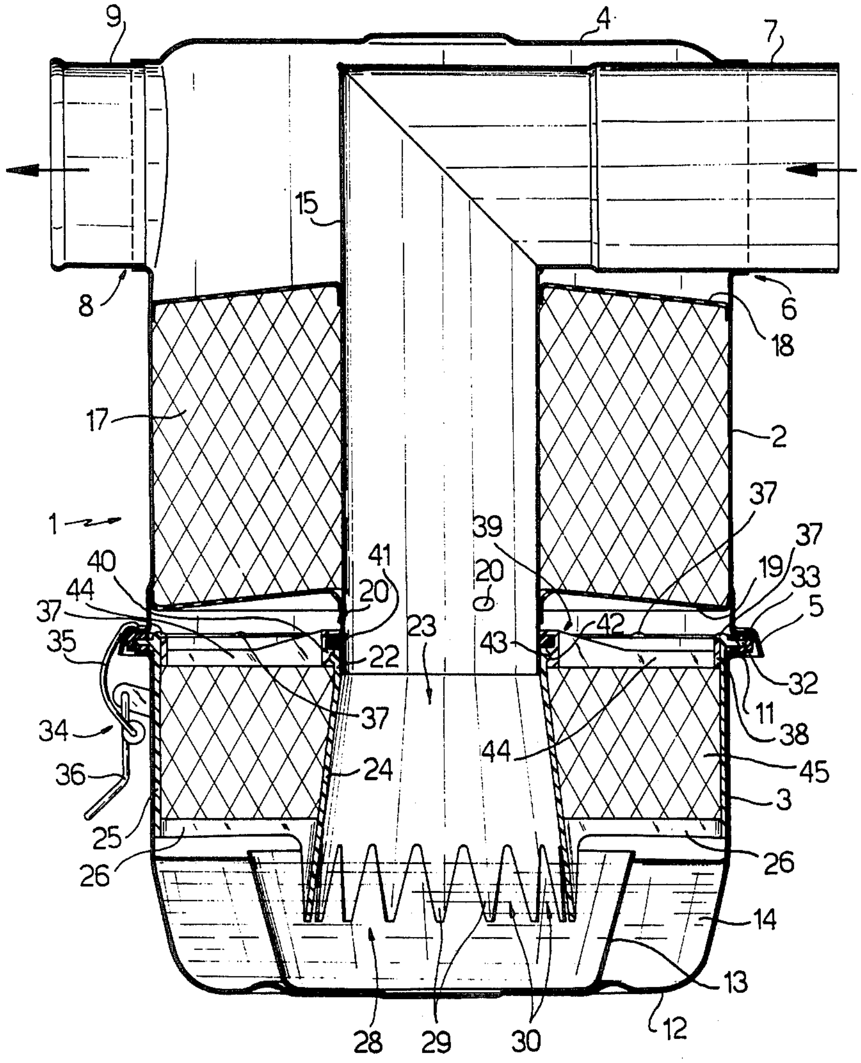
FIG. 1 is a side sectional view of a first embodiment of an air cleaner according to the present invention.

With reference to FIG. 1, the air cleaner according to the present invention comprises a substantially cylindrical outer casing indicated by 1, and advantageously made of sheet metal, comprising an upper part 2 and a lower part 3 which can be separated. The upper part 2 comprises an upper head 4, and an open bottom end having a substantially L-shaped outer annular rim 5 to provide an enlarged diameter lip around the open bottom. In its upper region, the part 2 comprises a bore 6 into which a sheet metal conduit portion 7 is inserted as an air inlet, and a sheet metal conduit portion 9 is welded into a bore 8 so that it emerges from the casing 1 for expelling the outlet air.

The lower part 3 is open at its upper end and comprises an outer annular rim 11, whereas its lower region is of progressively decreasing diameter and has a lower end 12 to the inside of which is welded a suitably bored socket 13, the diameter of which progressively increases upwards, and which is of slightly greater height than the height of the lower decreasing diameter region of the part 3. The oil 14 is contained in this lower decreasing diameter region of the part 3 and inside the socket 13.

The end of the conduit portion 7 inside the casing 1 is cut at 45°, and is welded to the upper end, also cut at 45°, of a vertical conduit portion 15 of sheet metal, disposed axially in the casing 1. Said conduit portion 15, which is cylindrical, terminates at its lower end at a slightly lower level than the level of the rim of the lower part 3. In the upper part 2 of the casing 1, about said conduit portion 15, there is disposed a filter cartridge 17 of known type, preferably constructed of tubular galvanized steel mesh, and enclosed between an upper annular disc 18 and a lower annular disc 19, the first of which is welded to the part 2 of the casing 1, while the second is fixed to the vertical conduit portion 15 by a suitable clamp which deforms said disc 19 and forms corresponding indentations 20 in said conduit 15.

Figure 2:
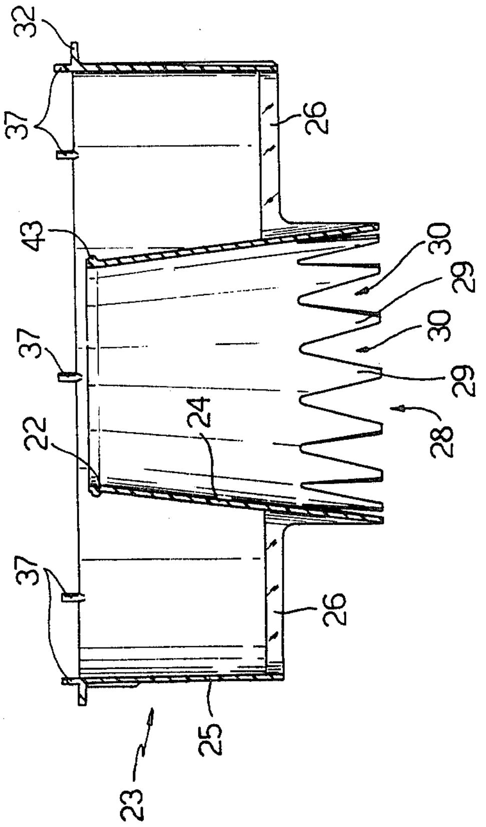
FIG. 2 is a side sectional view of a lower member for fitting to the inner conduit of the cleaner of FIG. 1.

On the outer lower region of the vertical conduit portion 15, there is mounted an upper cylindrical portion 22 of a member 23 which is preferably made of plastic, which comprises a cone frustum inner conduit 24 branching axially from the bottom of the cylindrical portion 22, as shown in FIG. 2, and having a diameter progressively increasing downwards, and comprising an outer cylindrical annular wall 25 joined at its lower end to said inner conduit 24 by a plurality of spokes 26, for example eight. The inclination of the generating lines of the conduit 24 to the axis of the member 23 is advantageously 7°, but with an allowable range of variation of 5° to 9°. The length of said conduit 24 is such that its lower edge terminates substantially in proximity to the middle of the height of the socket 13, and has a lower diameter such that it is contained inside this latter. Toothing 28 is provided on the lower part of the conduit 24, and is in the form of a plurality of teeth 29 and spaces 30 of substantially triangular shape distributed equidistantly. The height of said toothing 28 substantially reaches the level of the spokes 26, so that the lower vertices of the teeth 29 are immersed in the oil 14, and the upper vertices of the spaces 30 are substantially at the upper level of the oil 14.

The outer annular cylindrical part 25 has an outer diameter substantially equal to the inner diameter of the lower part 3 of the casing 1, and is substantially equal in height to the length of the cylindrical portion of the lower part 3. In addition, it comprises upperly an outer perimetral rim 32 about which a perimetral gasket 33 of C section is disposed, and is compressed between the outer annular rim 5 of the part 2 and the outer annular rim 11 of the part 3, by closing hooks 34 which comprise mutual hooking and fixing parts 35 and 36 fixed respectively to the upper part 2 and lower part 3 of the casing 1.

Branching vertically from the upper edge of the wall 25, the member 23 comprises a plurality of appendices 37 which, as can be seen in FIG. 1, are heated for deformation and then turned over the upper edge of a member 39, also of plastics construction, which comprises a central ring 40, the inner diameter of which is substantially equal to the outer diameter of the conduit portion 15, on the lower part of which it is disposed. In the inner wall of said ring 40 there is housed an annular gasket 41 for forming a seal about the conduit portion 15, and there is provided an annular seat 42 for snap-hooking a corresponding outer annular projection 43 on the cylindrical portion 22. The annular cylindrical wall 38 of the member 39 is connected to the central ring 40 by a plurality of spokes 44, for example equal in number to the spokes 26. A filter cartridge 45 of the same type as the filter cartridge 17 is housed between the spokes 26 and 44.

The cleaner of FIG. 1 according to the present invention is assembled as follows.

The upper part 2 and lower part 3 of the casing 1 are constructed separately, with the conduit portion 9, the conduit portions 7 and 15 and the discs 18 and 19 which enclose the filter cartridge 17 connected to the part 2, and the socket 13 connected to the part 3. The member 39 is then fixed on to the member 23 by snap-hooking the annular projection 43 into the seat 42 and deforming the appendices 37, after interposing the filter cartridge 45. After filling the lower part 3 with oil 14, the outer perimetral rim 32 of the member 23, about which the perimetral gasket 33 is disposed, is rested on the annular rim 11 of the lower part 3. The outer annular rim of the upper part 2 is then rested on the gasket 33, and the lower part of the conduit portion 15 is correspondingly inserted into the central ring 40 and into the upper cylindrical portion 22 of the member 23. The parts 2 and 3 are then hermetically fixed together by the hooks 34.

Figure 3:
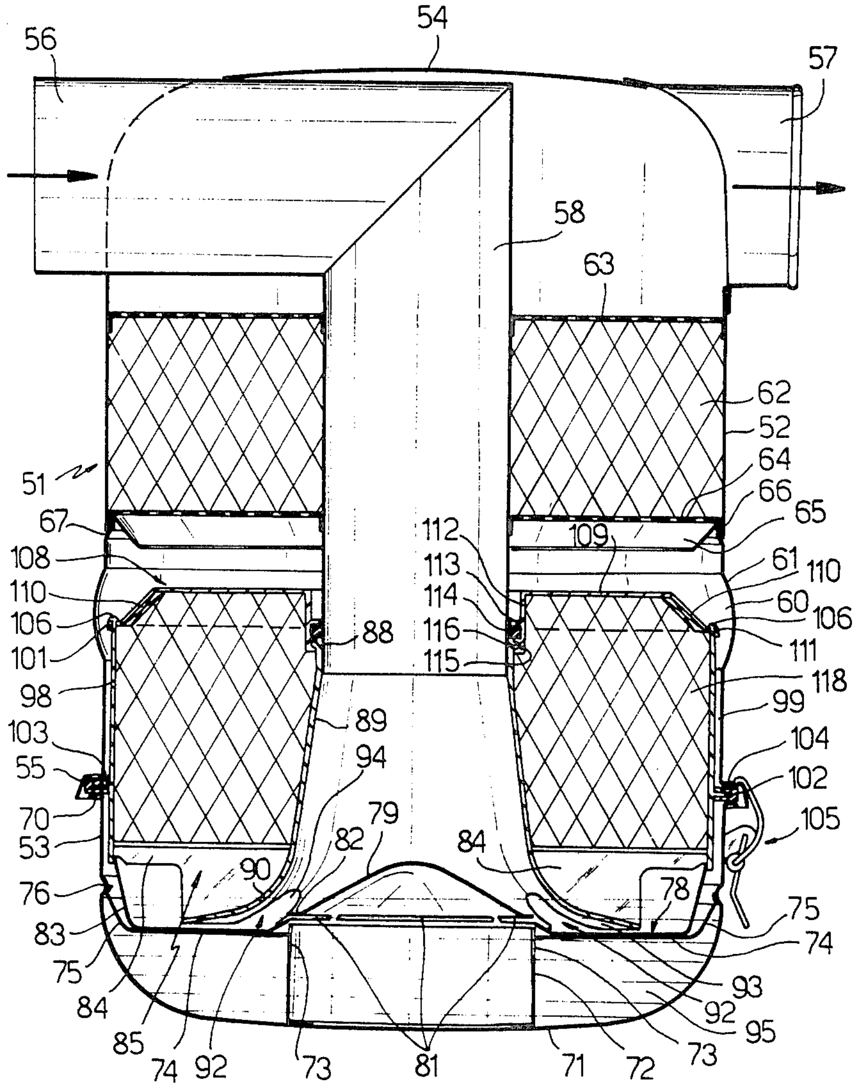
FIG. 3 is a sectional side view of a second embodiment of an air cleaner according to the present invention.

FIG. 3 shows a different embodiment of the air cleaner according to the present invention. This cleaner also comprises a substantially cylindrical outer casing indicated by 51, advantageously of sheet metal, and comprising an upper part 52 and a lower part 53 which are separable. The upper part 52 comprises an upper head 54, and an open bottom end having a substantially L-shaped outer annular rim 55 to provide an enlarged diameter lip around the open bottom. Conduit portions 56 and 57 are fixed towards the top of the part 52 for the inlet and outlet of the air respectively, and are similar to the conduit portions 7 and 9 of FIG. 1. In addition, the conduit portion 56 is fixed to a vertical axial conduit portion 58 similar to the conduit portion 15.

The conduit portion 58 terminates at its lower end at a slightly lower level than the level of an annular compartment 60 created by an annular swelling region 61 in the wall of the part 52. A filter cartridge 62 similar to the cartridge 17 of FIG. 1 is disposed in the top 52 of the casing 51 about the conduit portion 58, and is enclosed between an upper annular disc 63 and a lower annular disc 64, which are welded to the part 52 of the casing 51. An annular baffle 65 inclined inwardly towards the bottom of the casing 51 is fitted below the lower disc 64, and is provided with an annular wall 66 which is snap-fitted over inner teeth 67 provided on the wall of the part 52.

The lower part 53 is open at its upper end, and comprises an outer annular rim 70, whereas its lower region is of progressively decreasing diameter and has a lower base 71, to the inside of which is welded a cylindrical socket 72 having a height slightly less than the height of the decreasing diameter region of the lower part 53. Towards the top of the socket 72, where a plurality of bores 73 are provided, there are fixed a plurality of radial fins 74, for example eight, which towards their outer end comprise portions 75 bent upwards to rest on an inner annular projection 76 on the lateral wall of the lower part 53. A disc 78 is fixed on said radial fins 74, for example by welding, and comprises at its center, above the socket 72, an approximately conical upwardly pointing part 79 comprising, in proximity to its base above the edge of the socket 72, a number of longitudinal long slots 81, for example four, originating from a sheet metal portion 82 of the part 79 which is cut and bent upwards. The disc 78 comprises an upwardly bent annular portion 83 at its outer edge, and which by its contact with spokes 84 of a member 85 cooperates in positioning said member 85.

Figure 4:
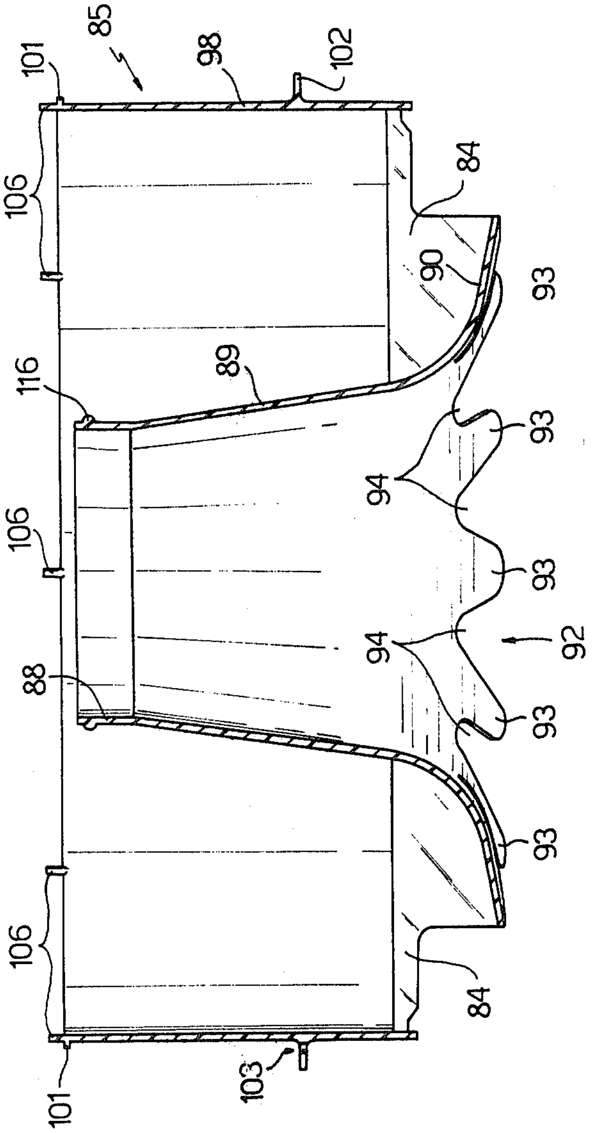
FIG. 4 is a sectional side view of a lower member for fitting to the inner conduit of the cleaner of FIG. 3.

The member 85 (better visible in FIG. 4) is constructed similarly to the member 23 of FIG. 2, according to the present invention. In this respect, the member 85 which is preferably made of plastic comprises centrally an upper cylindrical portion 88 similar to the portion 22 of the member 23 of FIG. 2, which is mounted over the outer lower region of the conduit portion 58. An inner cone frustum conduit 89 with its diameter progressively increasing downwards from the bottom of the portion 88 has a flared terminal portion 90. The inclination of the generating lines of the conduit 89 is also advantageously $7° \pm 2°$, as in the case of the conduit 24. The length of the conduit 89 with the portion 90 is such that the lower edge of the portion 90 is in proximity to the disc 78, and the shape of the terminal portion 90 is such as to define, towards the part 79, a region of minimum section at the slots 81. In said terminal portion 90 there is provided toothing 92 similar to the toothing 28, and in the form of a plurality of substantially triangular teeth 93 and spaces 94 distributed uniformly. The height of the toothing 92 substantially reaches the beginning of the portion 90, so that the lower vertices of the teeth 93 are immersed in oil, indicated by 95, which fills the bottom 53 as far as the inner annular projection 76, and the upper vertices of the spaces 94 are substantially at the upper level of the oil 95. An outer annular cylindrical wall 98 is rigidly connected by the spokes 84 to the portion 90, and has an outer diameter less than the inner diameter of the casing 51, so as to define an annular chamber 99. The cylindrical wall 98 reaches the annular compartment 60, and upperly comprises an outer perimetral rim 101. It also comprises, substantially a little below its middle, an outer perimetral appendix 102 in which a plurality of through bores 103 are provided. A perimetral gasket 104 of C-cross-section is disposed about the edge of the appendix 102 externally to the bores 103, and is compressed between the outer annular rim 55 of the part 52 and the outer annular rim 70 of the part 53, by closing the hooks 105, similar to the hooks 34 of FIG. 1.

Figure 5:
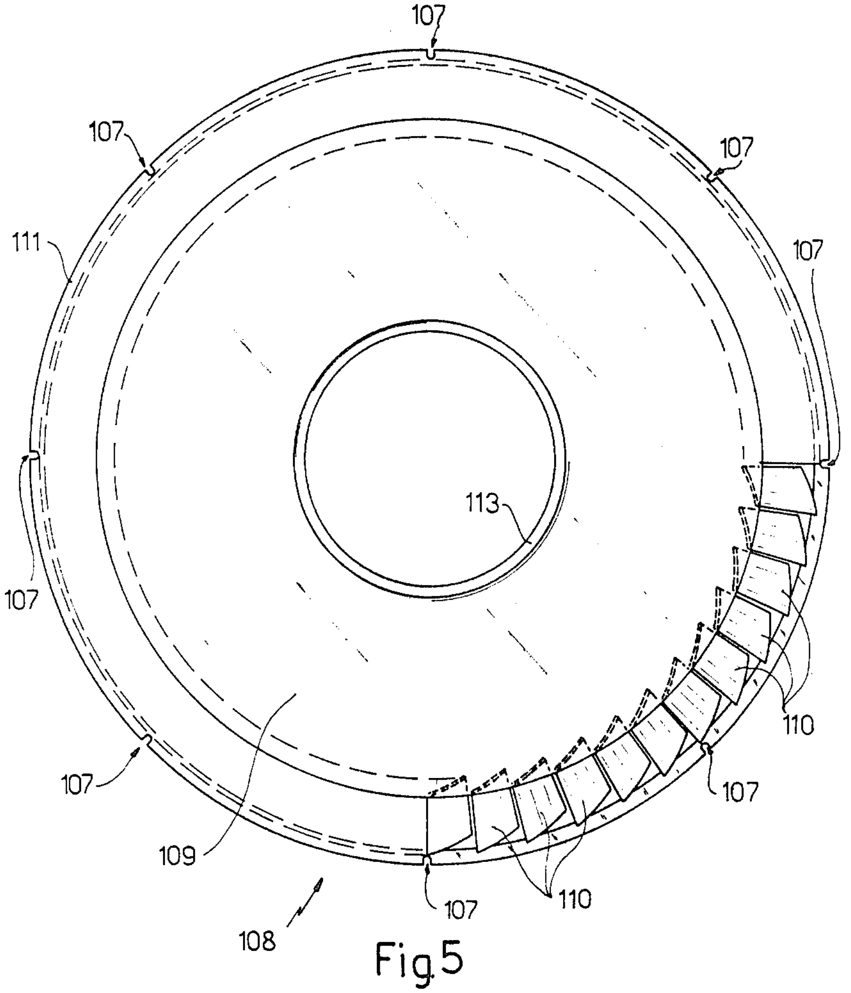
FIG. 5 is a partial plan view of a member which lies above the member of FIG. 4.

The member 85 also comprises a plurality of appendices 106 extending vertically from the upper edge of the wall 98, which, as shown in FIG. 3, are inserted into corresponding slots 107 (FIG. 5) in an outer edge 111 of a member 108, and are bent over by hot-turning over the edge 111 so as to fix the member 108 on to the member 85. The member 108, also of plastics construction, has an upper flat surface 109 comprising, towards the outer edge 111, a plurality of fins 110 which are suitably spaced apart and inclined to form helical finning in order to form spaces which provide substantially helical flow of air therethrough. On the inside of the flat surface 109 there is a cylindrical wall portion 112 which at its bottom comprises a central ring 113, the inner diameter of which is substantially equal to the outer diameter of the conduit portion 58, on the bottom of which it is disposed. An annular gasket 114 for sealing about the conduit portion 58 is housed in the inside of the ring 113, and an annular seat 115 is provided for snap-hooking a corresponding outer annular projection 116 on the cylindrical part 88. A filter cartridge 118, of the same type as the filter cartridge 62, is enclosed between the members 85 and 108.

The cleaner of FIG. 3, constructed according to the present invention, is assembled as follows.

The upper part 52 and lower part 53 of the casing 51 are constructed separately, with the conduit portion 57, the conduit portions 56 and 58, the discs 63 and 64 which enclose the filter cartridge 62, and the annular screen 65 connected to the part 52, and the socket 72 with the fins 74 and disc 78 connected to the part 53. The member 108 is fixed on to the member 85 by snap-fitting the annular projection 116 into the seat 115 and turning the appendices 106 over the edge 111, after interposing the filter cartridge 118. After filling the bottom 53 with oil 95, the outer perimetral rim 103 of the member 85, about which the perimetral gasket 104 is disposed, is rested on the annular rim 70 of the lower part 53, and the outer lower edge of the spokes 84 rests on the upper edge of the portion 83 of the disc 78. The outer annular rim 55 of the upper part 52 is then rested on the gasket 104, and correspondingly the bottom of the conduit portion 58 is inserted into the central ring 113 and into the upper cylindrical portion 88 of the member 85. The parts 52 and 53 are then hermetically fixed together by the hooks 105.

The operation of the air cleaner of FIG. 1 is as follows. By means of the suction exerted on the conduit portion 9, the air to be filtered enters the conduit portion 7, passes through the vertical conduit portion 15 and the conduit 24 of the member 23, and flows through the spaces 30 of the toothing 28, and coming in contact with the oil 14. A large part of the impurity particles present in the air are retained by the oil particles which are lifted by the suction and are halted by the filter cartridges 45 and 17. The oil then falls into the bottom of the lower part 3 outside the socket 13, into which it returns through bores (not shown). The purified air flows from the casing 1 through the conduit portion 9. The described air cleaner of FIG. 1, constructed according to the present invention, is free from the said drawbacks of cleaners of known type. In this respect, because the air flows through the inclined wall conduit 24 towards the oil in the bottom of the casing 1, relatively small pressure drops arise, and sufficiently high throughputs can be obtained. Furthermore, the filter efficiency at low throughputs is considerably improved. This is because at low throughputs the oil level in the bottom 3 is relatively high, so that the uncovered section of the spaces 30 in the toothing 28 is relatively small. There is thus a flow velocity of the air through the spaces 30 which is sufficient to allow it to associate itself with the necessary oil quantity for filtering the air. This flow velocity under working conditions is established naturally by an equilibrium condition between the progressive uncovering of the spaces 30 and the progressive reduction in the air velocity.

At medium and high throughputs, greater sections of the spaces 30 are uncovered, but the flow velocity of the air is substantially almost constant, such as to determine a constant and optimum ratio between the air quantity passing through the cleaner and the oil quantity associated with the air during its passage, to substantially ensure uniform filtration conditions.

The operation of the air cleaner of FIG. 3 is substantially similar to that described for the cleaner of FIG. 1. The air to be filtered is drawn through the conduit portions 56 and 58, and passes through the conduit 89 and the portion 90 of the member 85. In the region of smaller section, relative to the disc 78, it draws oil 95 through the slots 81 and then flows out through the spaces 94 of the toothing. A large part of the impurity particles present in the air is retained by the oil particles, which are lifted by the suction and which to a certain extent are halted by the filter cartridge 118. The other impurity particles in the air, whether mixed with oil or not, together with the air itself, flow from the top of the member 85, pass through the spaces between the fins 110 in the form of helical shaped fins, and are subjected to centrifugal action, because of which the impurity particles and the oil are forced towards the wall of the part 52 because of the fact that their density is different from air density. The air, already considerably purified, then passes through the filter cartridge 62, which completely purifies it, and it flows from the casing 1 through the conduit portion 57. The oil and impurity particles present in the compartment 60, which is relatively undisturbed because of the baffling action exerted by the annular screen 65, fall downwards into the annular compartment 99 and the oil returns through the bores 103 into the bottom of the part 53 and hence into the socket 72, whereby the described cycle recommences.

The cleaner of FIG. 3 also has the advantages described for the cleaner of FIG. 1 over cleaners of known type. In this respect, because of the particularly flared shape of the terminal portion 90 of the member 85, even smaller pressure drops are obtained. Moreover, the cleaner of FIG. 3 can be advantageously used under particularly severe conditions, to ensure an even better filtering efficiency because of the suction action on the oil created by the slots 81, leading to a more intimate mixing with the air, and because of the centrifugal action on the air and the oil and impurity particles created by the member 108, by way of the fins 110.

Finally, it is apparent that modifications both in the shape and arrangement of the various constituent parts can be made to the described embodiments of the cleaner according to the present invention, without leaving the scope of the inventive idea contained therein.

What we claim is:

1. An air cleaner for internal combustion engines of the type which include a casing having an air inlet and air outlet, at least one filter cartridge, and a pool of liquid therein; and wherein air from the inlet of the casing flows into contact with the liquid, then flows through said filter cartridge, and then flows towards the outlet of the casing: said air cleaner comprising first means to provide a substantially constant ratio between the quantity of air passing through said cleaner and the quantity of liquid associated with the air during its passage, said first means comprising a substantially vertical tubular member having (a) a plurality of spaced teething defining open spaces, at least partially immersed in said pool of liquid, for the passage of air and (b) having a frusto-conical portion at its lower end which includes said spaces and having its wide circumference at the bottom of said portion, and having an inclination of its generating lines of between 5° and 9° relative to its axis; and wherein said air flows downwardly through said tubular member, through said spaces in contact with said liquid, and then through said cartridge, and wherein any increase in air pressure effects a lowering of the liquid level in said pool of liquid in said frusto-conical portion, thereby increasing the area of said spaces and the surface area of liquid contacting said air.

2. The air cleaner as claimed in claim 1, wherein said frusto-conical portion of said tubular member includes a flared end in which said spaces are provided.

3. The air cleaner as claimed in claim 1, and further comprising a plurality of said cartridge and second means for exerting a centrifugal action on the air leaving the first of said cartridges and receiving the air passed into contact with the liquid, said second means comprising an annular member secured to said tubular member and having a plurality of circumferentially spaced inclined fins forming spaces to provide a helically directed flow of air past said annular member.

4. The air cleaner as claimed in claim 3, wherein said first filter cartridge is secured around said tubular member by said annular member.

5. The air cleaner as claimed in claim 3, wherein above said second means there is disposed third means for creating a relatively calm region towards the lateral wall of the casing of said cleaner, said third means comprises an annular baffle fixed to the lateral wall of said casing and wherein said casing includes an enlarged diameter portion in its lateral wall between said second means and said third means; and wherein said cleaner further comprises passage means between said enlarged diameter region and said pool of liquid, said passage means being positioned near the bottom of the casing in order to recirculate the liquid in said cleaner.

6. The air cleaner as claimed in claim 5, wherein said passage means for the passage of said liquid is provided between an outer lateral wall of said annular member and the wall of the outer casing of said cleaner.

7. The air cleaner as claimed in claim 6, wherein said outer lateral wall of said internal member is provided with an outer annular rim which is hermetically enclosed between two separable parts of the outer casing of said cleaner; bores being provided in said outer annular rim for the passage of said liquid through said compartment.

8. The air cleaner as claimed in claim 5, wherein said plurality of filter cartridges includes a second filter cartridge which is disposed above said third means.

9. The air cleaner as claimed in claim 8, wherein at least one of said first and second filter cartridges are made of the metal mesh.

10. The air cleaner as defined in claim 8 wherein said first and second filter cartridges are made of metal wool.

11. The air cleaner as claimed in claim 3, wherein said tubular member and said annular member are made of plastic.

12. The air cleaner as claimed in claim 1, wherein the liquid is oil.

13. The air cleaner as claimed in claim 3, wherein said second means comprises a disc supported by said casing and having a conical central portion and extending into an end portion of said tubular member, said disc having at least one row of narrow elongated slots around its periphery.

* * * * *